United States Patent
Hikichi et al.

(10) Patent No.: US 8,164,771 B2
(45) Date of Patent: Apr. 24, 2012

(54) IMAGE PROCESSING APPARATUS FOR TREATING RECORDING MEDIUM PROVIDED WITH RFID CHIP

(75) Inventors: Yukiyoshi Hikichi, Tokyo (JP); Koichi Honma, Tokyo (JP); Hironobu Kitabatake, Tokyo (JP); Kenji Hara, Kanawaga (JP); Mikio Hama, Kanawaga (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 10/827,255

(22) Filed: Apr. 20, 2004

(65) Prior Publication Data

US 2004/0196485 A1 Oct. 7, 2004

Related U.S. Application Data

(63) Continuation of application No. PCT/JP03/13533, filed on Oct. 23, 2003.

(30) Foreign Application Priority Data

Oct. 30, 2002 (JP) .................................. 2002-316405

(51) Int. Cl.
*G06F 3/12* (2006.01)
*G06K 15/00* (2006.01)

(52) U.S. Cl. ...................... 358/1.15; 358/1.13; 358/1.14

(58) Field of Classification Search .................... None
See application file for complete search history.

(56) References Cited

U.S. PATENT DOCUMENTS

| | | | | |
|---|---|---|---|---|
| 5,530,702 A * | 6/1996 | Palmer et al. | | 370/445 |
| 5,878,198 A | 3/1999 | Yuasa et al. | | 395/117 |
| 6,381,418 B1 | 4/2002 | Spurr et al. | | 396/310 |
| 6,409,401 B1 * | 6/2002 | Petteruti et al. | | 400/88 |
| 2001/0008002 A1 | 7/2001 | Hara | | 710/240 |
| 2002/0186390 A1 | 12/2002 | Hara | | 358/1.9 |
| 2003/0160992 A1 * | 8/2003 | Weaver | | 358/1.14 |
| 2003/0164971 A1 | 9/2003 | Kidani et al. | | 358/1.13 |
| 2004/0070790 A1 | 4/2004 | Hara | | 358/1.16 |

FOREIGN PATENT DOCUMENTS

| | | |
|---|---|---|
| JP | 2001-088911 | 4/2001 |
| JP | 2001-143026 | 5/2001 |
| JP | 2002-056421 | 2/2002 |
| JP | 2002-337426 | 11/2002 |
| JP | 2002-029667 | 1/2003 |

OTHER PUBLICATIONS

European Search Report, Jan. 27, 2004.

* cited by examiner

*Primary Examiner* — Twyler Haskins
*Assistant Examiner* — Marcus T Riley
(74) *Attorney, Agent, or Firm* — Fitzpatrick, Cella, Harper & Scinto

(57) ABSTRACT

An image processing system includes a host computer which generates print data and a printer which prints an image based on the print data. The host computer sets attribute information which indicates a part of the print data which is allowed to be visualized and a part of the print data which is prohibited to be visualized. In addition, the host computer also sets authentication information required for reading the part prohibited to be visualized, and transmits the print data, the attribute information, and the authentication information to the printer. The printer prints a visual image of the part allowed to be visualized on a paper medium provided with an RFID chip and stores the part prohibited to be visualized in the RFID chip. In addition, the printer prints the information stored in the RFID chip on another paper medium as a visual image after authentication with the authentication information.

6 Claims, 4 Drawing Sheets

IMAGE PROCESSING APPARATUS FOR TREATING RECORDING MEDIUM PROVIDED WITH RFID CHIP

This application is a continuation of International Application No. PCT/JP03/13533, filed on Oct. 23, 2003, which claims the benefit of Japanese Patent Application No. 2002-316405 filed on Oct. 30, 2002.

BACKGROUND OF THE INVENTION

1. Field of the Invention

The present invention relates to an image processing apparatus which prints and reads an image on a recording medium.

2. Related Background Art

In order to make a copy of a document, processes of reading the document with a scanner and printing it with a printer are necessary, and a copy which is exactly the same as the document can thus be obtained. However, a large amount of paper media is necessary to convey a large amount of information. Therefore, when a large amount of information is to be carried in the form of paper documents, a large number of paper documents are necessary.

More specifically, according to known techniques, a large number of paper documents are necessary to carry all of the information, and it is cumbersome to handle them. In addition, since all of the information output on the paper documents and their copies are viewable, anyone can view the information even if it is intended to be read only by specific users.

SUMMARY OF THE INVENTION

An object of the present invention is to provide an image processing apparatus and an image processing method which are free from the above-described problems.

Another object of the present invention is to provide an image processing apparatus and an image processing method for receiving image data, printing an image on a recording medium on the basis of the image data, and storing the image data in a storage device attached to the recording medium.

In addition, another object of the present invention is to provide an image processing apparatus and an image processing method in which a part of image data which is allowed to be visualized and a part of the image data which is not to be visualized are discriminated from each other when the image data is output to a printer.

In addition, another object of the present invention is to provide an image processing apparatus and an image processing method for receiving image data, printing a part of the image data which is allowed to be visualized on a recording medium as a visual image, and storing a part of the image data which is not to be visualized in a storage device attached to the recording medium.

Further objects, features and advantages of the present invention will become apparent from the following description of the preferred embodiments with reference to the attached drawings.

DESCRIPTION OF THE PREFERRED EMBODIMENTS

An embodiment of the present invention will be described in detail below with reference to the accompanying drawings.

Figure 1:
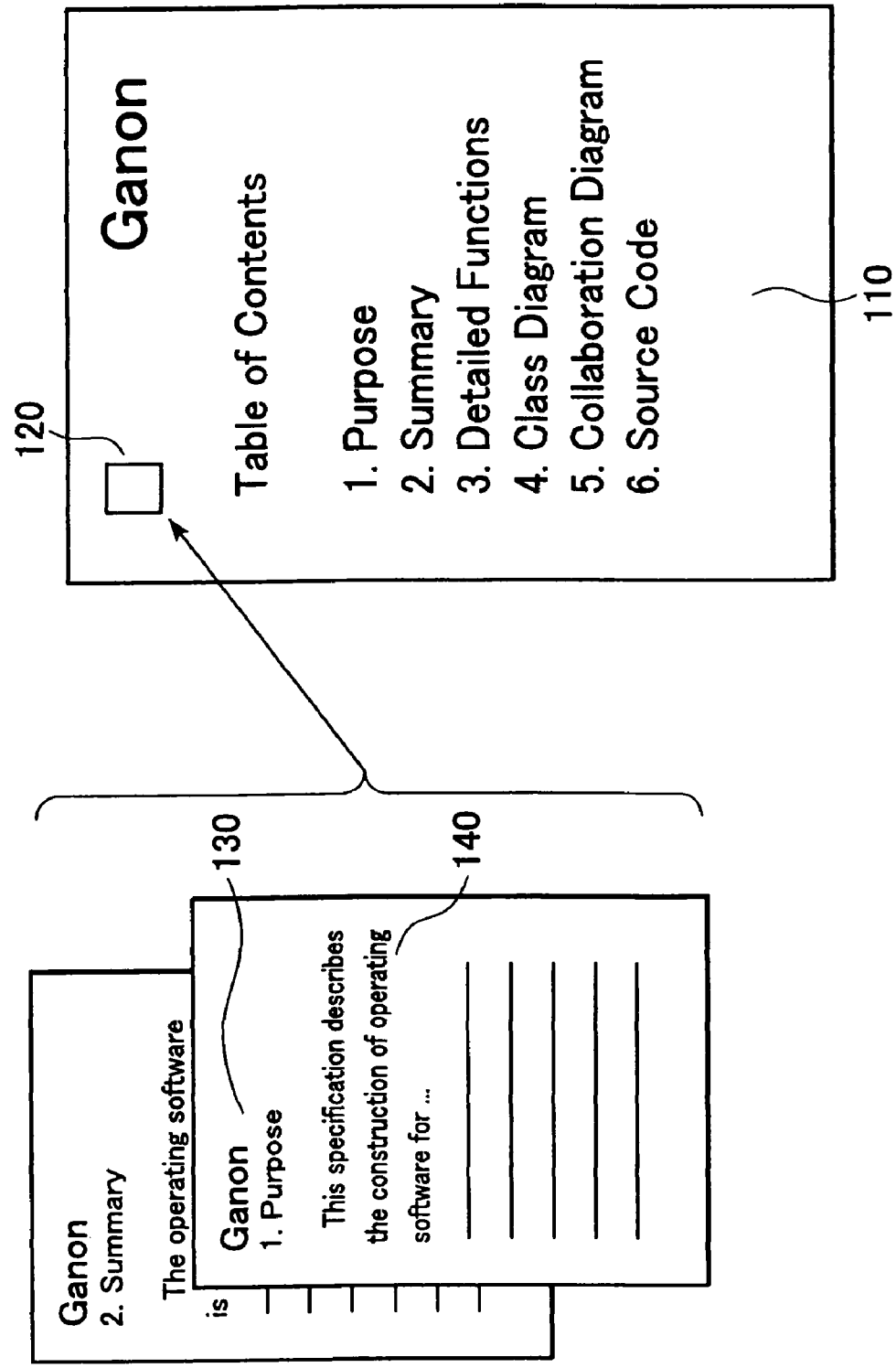
FIG. 1 is a diagram showing a paper medium used in an image processing apparatus according to an embodiment of the present invention.

FIG. 1 is a diagram showing a paper medium used in the present embodiment. In FIG. 1, reference numeral 110 denotes the paper medium and reference numeral 120 denotes a radio frequency identification (RFID) chip, which is an IC memory chip having enough capacity to store information to be carried. The RFID chip 120 stores information, such as image information 130 and text information 140, which can be visualized on paper media afterwards. In addition, the RFID chip 120 may also store authentication information and attribute information, which will be described below. The information can be written and read by an image processing apparatus which will be described below. The RFID chip 120 may be either adhered to or watermarked in the paper medium 110, and the thickness and size of the RFID chip 120 are set such that handling of the paper medium 110 is not affected.

In addition, the RFID chip 120 includes an antenna for communicating data with an RFID-chip reader and an RFID-chip writer, which will be described below, via radio waves.

As shown in FIG. 1, a table of contents of the information stored in the RFID chip 120 is printed on the paper medium 110 by the image processing apparatus according to the present embodiment as visual information which can be viewed by anyone. Thus, all users can see the subjects of the information stored in the RFID chip 120 by reading the table of contents.

Figure 2:
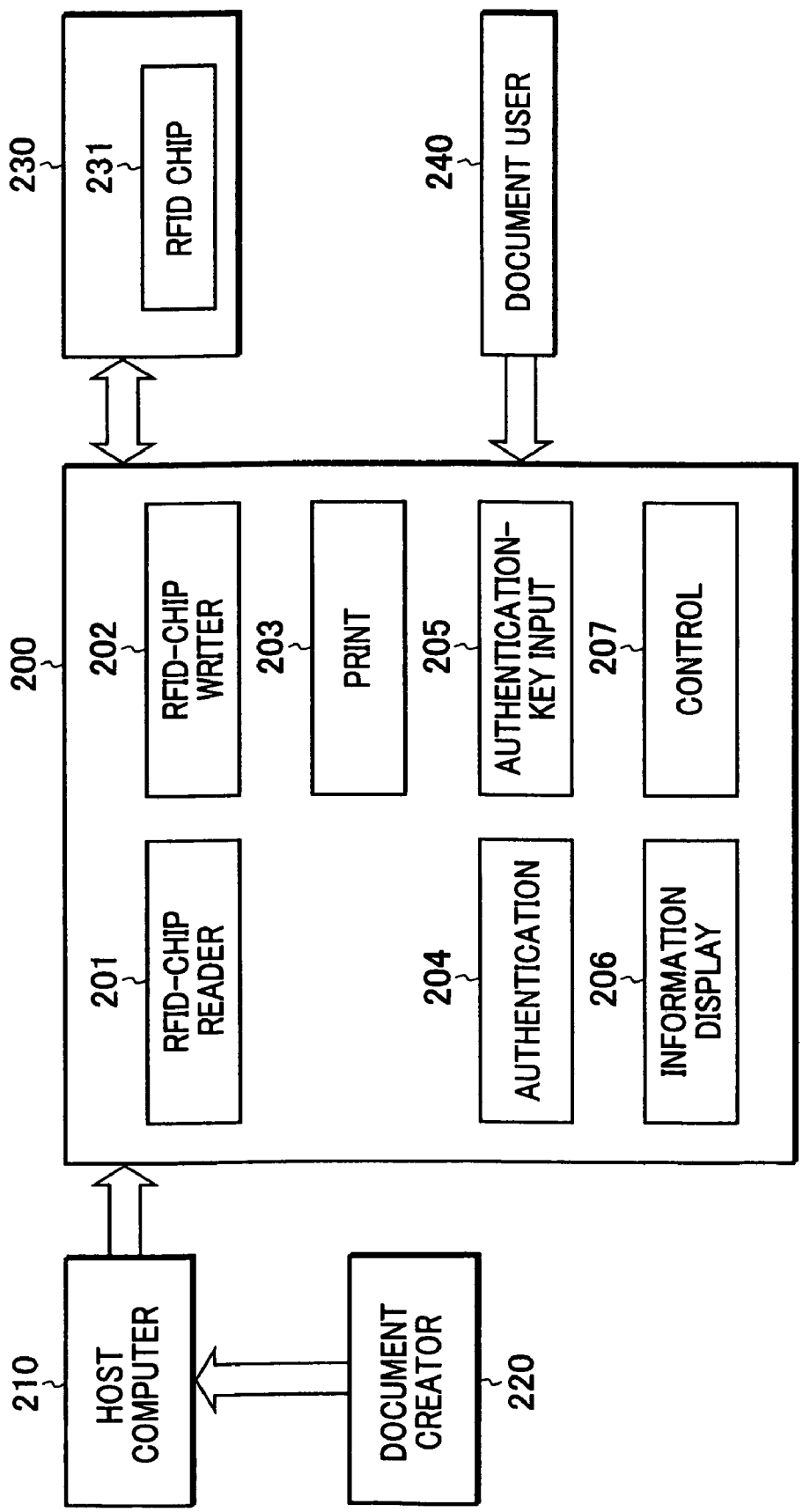
FIG. 2 is a schematic block diagram showing the construction of an image processing system according to the embodiment.

FIG. 2 is a block diagram showing the construction of the image processing system according to the present embodiment. The image processing system includes an image processing apparatus 200 which prints an image on a paper medium and a host computer 210 with which a user (document creator 220) creates a document which is to be printed by the image processing apparatus 200. The image processing apparatus 200 and the host computer 210 are connected to each other with, for example, an interface such as a universal serial bus (USB) and a Centronics interface, a wired or wireless local area network (LAN) for connecting a plurality of terminals, a phone line, etc.

The host computer 210 is a known personal computer or the like and includes a central processing unit (CPU) which controls various operations; a read only memory (ROM) which stores a boot program, etc.; a random access memory (RAM) used as a work area for the CPU; a hard disk drive (HDD) which stores software programs which will be described below; a display which provides a user interface; a keyboard used by the user to input commands; etc. The HDD stores an operating system (OS); an application software program used for editing text information and image information; a printer driver which converts information output from the application software program into information which can be printed by the image processing apparatus 200 and outputs the converted information to the image processing apparatus 200; and a software program used when print data is output to the image processing apparatus 200 for setting a part of the data to be printed on the paper medium as a visual image, a part of the data to be stored in an RFID chip, and authentication information used for authentication when the data stored in the RFID chip is read. These software programs may be provided separately, or some of the software programs may be combined into a single software program. The CPU of the host computer 210 loads these software programs into the RAM and controls various operations.

The image processing apparatus 200 includes a RFID-chip reader 201 for reading the information stored in the RFID chip; a RFID-chip writer 202 for writing the information to the RFID chip; a printing unit 203 which prints an image on a paper medium by a known electrophotography method, an inkjet method, etc., based on the input information; an authentication unit 204 which performs authentication based on the authentication information stored in the RFID chip; an authentication-key input unit 205 used for inputting an authentication key when the authentication unit 204 performs authentication; an information display 206 which is, for example, a liquid crystal display which shows various information based on text information and graphic information and which has a function of a touch panel so that the user can input information; and a controller 207 which controls the overall operation of the image processing apparatus 200.

The controller 207 includes a CPU, a ROM, a RAM, and peripheral circuits, and the CPU controls the operation of the image processing apparatus 200 in accordance with programs and control data stored in the ROM. The RAM stores input image data, various tables, etc.

A process in which the user prints an image on a paper medium 230 with an RFID chip 231 using the image processing system according to the preset embodiment will be described below.

With reference to FIG. 2, the user (document creator 220) uses a word processor or the like which operates on the host computer 210 to create text and image information. Then, from the text and image information, the document creator 220 designates a part to be printed on the paper medium 230 as a visual image and a part to be stored in the RFID chip 231 without being printed. Such designation is not necessarily performed, and the above-described information may be divided in accordance with predetermined conditions. For example, information corresponding to a table of contents may be printed and other information may be stored in the RFID chip. In addition, the information to be stored in the RFID chip 231 may be classified into a plurality of information groups corresponding to a plurality of levels. The thus obtained information is transmitted to the image processing apparatus 200 along with the text and image information as attribute information. In addition, conditions for allowing a user to view the information stored in the RFID chip 231 may also be attached as the authentication information. The authentication information is also transmitted to the image processing apparatus 200 along with the text and image information and the attribute information.

Among the information generated by the host computer 210, the text and image information is converted into print data, output to the image processing apparatus 200, and written to the RFID chip 231 attached to the paper medium 230 by the RFID-chip writer 202 included in the image processing apparatus 200. At this time, information designated to be printed, for example, the table of contents of the information, is printed on the paper medium 230.

Then, if a document user 240 finds a section which he or she wishes to view in more detail in the table of contents printed on the paper medium 230, the document user 240 performs a predetermined operation, for example, he or she places the paper medium 230 close to the RFID-chip reader 201, so that corresponding information stored in the RFID chip 231 attached to the paper medium 230 is read via the antenna by the RFID-chip reader 201 included in the image processing apparatus 200. Since all of the related information is stored in the RFID chip 231, it is not necessary to access a server or the like via a network to obtain any of the information. Therefore, data leakage to the outside can be prevented and maintenance of the server is not necessary.

The authentication data stored in the RFID chip 231 is used for determining whether or not authentication is required for reading the information from the RFID chip 231. In this case, the authentication unit 204 performs authentication by comparing authentication information obtained by the authentication-key input unit 205 which receives an input from the document user 240 and the authentication data stored in the RFID chip 231. The authentication unit 204 may perform, for example, individual authentication using a user ID input from a keyboard, a password, a fingerprint, etc.

If the authentication succeeds, the corresponding information (text and image) stored in the RFID chip 231 is displayed on the information display 206. In addition, the information may also be printed on another paper medium by the printing unit 203 as necessary.

Figure 3:
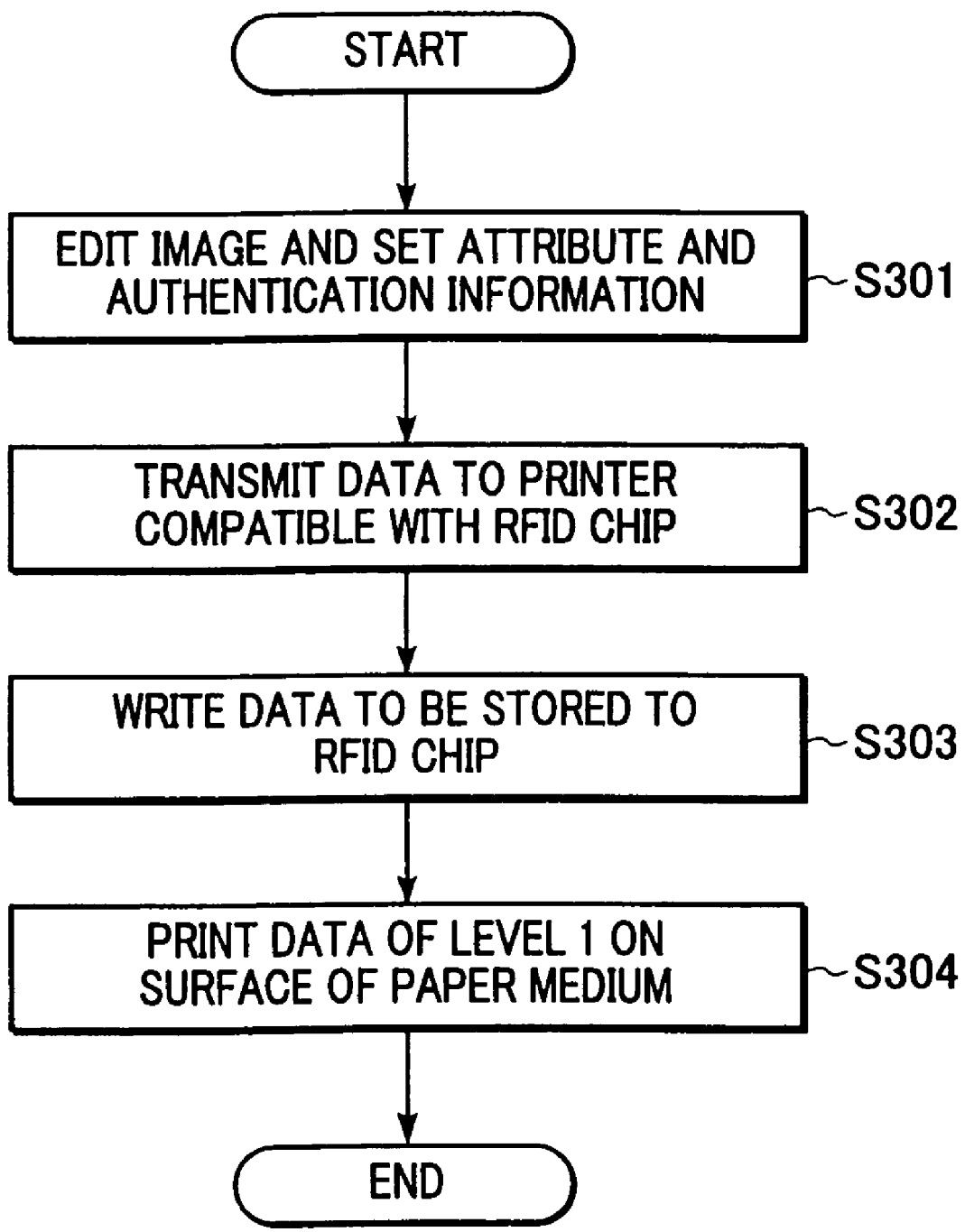
FIG. 3 is a flowchart showing a process in which a host computer outputs print data to the image processing apparatus and the image processing apparatus prints detailed information corresponding to a plurality of pages on a paper medium.

FIG. 3 is a flowchart showing a process in which a user prints out detailed information corresponding to a plurality of pages using the paper medium 230. In this case, an example is considered in which data of a software specification is stored in the RFID chip 231 attached to the paper medium 230 and necessary detailed sections of the specification are viewed and printed out.

Steps S301 and S302 are performed on the basis of programs stored in the host computer 210, and steps S303 and S304 are performed on the basis of programs stored in the image processing apparatus 200.

First, the user of the host computer 210 (the document creator 220) creates and edits the specification using a word processor or the like and sets attributes of a part to be printed and a part to be stored in the RFID chip and the authentication information (step S301). The authentication information is classified into levels in correspondence with the attribute information. For example, level 1 (authentication not necessary), level 2 (for general users), and level 3 (for specific users) are provided in the order from low level to high level.

Next, the user designates the image processing apparatus 200 as a printer, commands the printer driver to convert the specification data into a format suitable for printing, and outputs the specification data to the image processing apparatus 200 along with the attribute information and the authentication information in correspondence with each other (step S302). The image processing apparatus 200 has a paper cassette which is loaded with paper media with RFID chips. Among the specification data transmitted from the host computer 210, information which is to be stored according to its attribute is written to the RFID chip 231 by the RFID-chip writer 202 of the image processing apparatus 200 (step S303). In addition, a table of contents of the specification, which is to be printed according to its attribute, is printed on the surface of the paper medium 230, as in the paper medium 110 shown in FIG. 1 (step S304).

Next, a process in which a user of the specification refers to and prints the information stored in the RFID chip 231 attached to the paper medium 230 will be described below.

Figure 4:
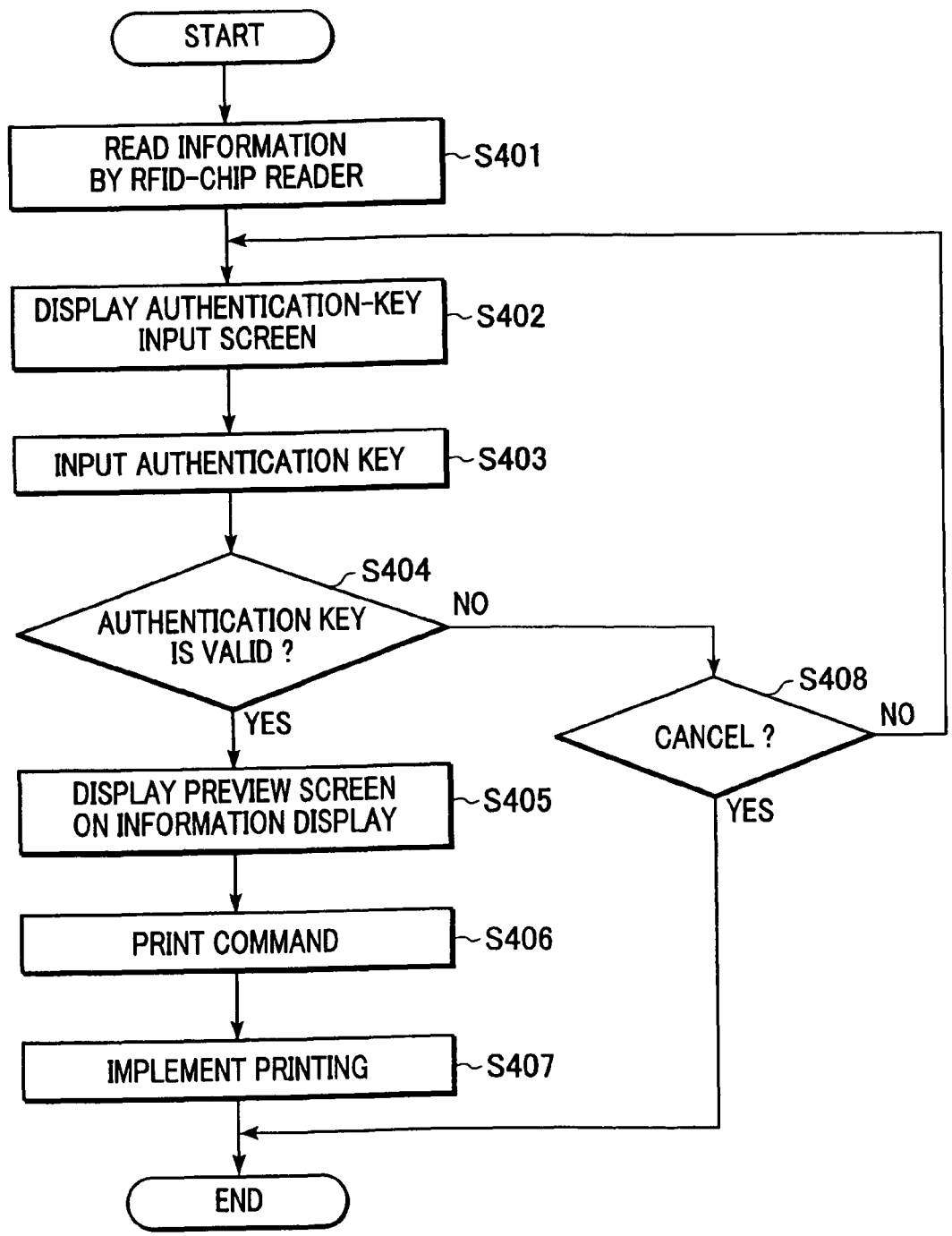
FIG. 4 is a flowchart showing a process of visualizing information stored in an RFID chip attached to the paper medium.

FIG. 4 is a flowchart showing a process of authentication and printing according to the present embodiment. This process is performed on the basis of the programs stored in the ROM of the controller 207 included in the image processing apparatus 200.

Before the above-described process is performed, the user reads the table of contents printed on the paper medium to see the subjects covered therein. If necessary, the publisher (creator of the information) informs the user of an authentication key in accordance with the use of the information. More specifically, when only a section regarding the general functions of the software in the specification is required, an authentication key of level 2 (for general users) is provided. In addition, when, for example, the user is a software designer who needs all of the information including the software's source code, an authentication key of level 3 (for specific users) is provided. A method of informing the user of the authentication key is not particularly limited. The user thus receives the authentication key and sets the paper medium 230 to the image processing apparatus 200 including the RFID-chip reader 201 in order to obtain more detailed information.

Accordingly, the RFID-chip reader 201 reads the information stored in the RFID chip 231 (step S401). The information display 206 of the image processing apparatus 200 shows the table of contents, which is the same as that printed on the paper medium 230, on the basis of the information read by the RFID-chip reader 201. Then, when the user touches the information display 206 at a position corresponding to a section which the user wishes to view in more detail, a screen requiring an authentication password is shown on the display if the corresponding section is protected by the authentication data (step S402). Then, the user inputs the authentication key obtained in advance using the authentication-key input unit 205 (step S403). If it is determined that the authentication key is valid (step S404), information corresponding to the level of the authentication key (for example, detailed information including the software's source code in the above-described case) is shown on the information display 206 (step S405). If the authentication key is invalid, a message asking whether or not to continue the authentication process is shown (step S408). The process returns to step S402 if it is to be continued and ends if it is to be canceled.

In addition, the user may issue a print command using the information display 206 (step S406) and print the corresponding information on paper media as necessary (step S407).

As described above, according to the present embodiment, a part of information allowed to be viewed by anyone is printed on a print medium, and other information is stored in an RFID chip. Accordingly, a large amount of information can be carried by a print medium which can be easily handled. In addition, a print medium which carries a large amount of information and provides protection of the data at the same time can be provided.

In addition, information which can be disclosed is released to everyone, and users authorized to view detailed information can view and print the information without accessing a network.

The present invention may be applied to a system including a plurality of devices (for example, a host computer, an interface device, a reader, a printer, etc.), as well as to an apparatus consisting of a single device (for example, a copy machine, a facsimile machine, etc.)

The objects of the present invention may also be achieved by supplying a storage medium storing a program code of a software program for implementing the functions of the above-described embodiment to a system or an apparatus and causing a computer (CPU or MPU) of the system or the apparatus to read and execute the program code stored in the storage medium.

In that case, the program code itself which is read from the storage medium provides the functions of the above-described embodiment, and thus the storage medium which stores the program code constitutes the present invention.

The storage medium for supplying the program code may be, for example, a floppy disk, a hard disk, an optical disk, a magneto-optical disk, a CD-ROM, a CD-R, a magnetic tape, a non-volatile memory card, a ROM, etc.

In addition, the functions of the above-described embodiment may be achieved not only by causing the computer to read and execute the program code but also by causing, for example, an operating system (OS) running on the computer to execute some or all of the process on the basis of instructions of the program code.

Furthermore, the functions of the above-described embodiment may also be achieved by writing the program code read from the storage medium to a memory of a function extension board inserted in or connected to the computer and causing a CPU of the function extension board to execute some or all of the process on the basis of instructions of the program code.

The above-described paper medium may be a piece of plain paper used for normal copying, cardboard, special paper, etc., and kinds of the paper medium is not limited. In addition, various storage devices, such as grain-shaped devices and card-shaped devices, may be used as the RFID chip attached to the paper medium, as long as handling of the paper medium is not affected.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   an input unit which inputs first image information to be printed on a recording medium and second image information to be stored in a storage device which is attached to the recording medium;
   a printer which prints a table of contents of the second image information on the recording medium to which the storage device is attached, wherein the table is based on the first image information;
   a writing unit which writes the second image information, first authentication information and second authentication information to the storage device attached to the recording medium, wherein the first authentication information is used for authenticating a first user who is allowed to view a first level of the contents indicated by the table, and the second authentication information is used for authenticating a second user who is allowed to view a second level of the contents indicated by the table and who is not allowed to view the first level of the contents indicated by the table;
   a reading unit which reads the second image information, the first authentication information and the second authentication information which have been stored in the storage device attached to the recording medium on which the table based on the first image information has been printed; and
   a user authentication information input unit which inputs user authentication information,
   wherein said printer prints the second image information read by said reading unit which the first user can view, if the input user authentication information corresponds to the first authentication information, and prints the second image information read by said reading unit which the second user can view, if the input user authentication information corresponds to the second authentication information.

2. An image processing apparatus according to claim 1, further comprising a display unit which displays the second image information read by said reading unit which the first user can view, if the input user authentication information corresponds to the first authentication information, and displays the second image information read by said reading unit which the second user can view, if the input user authentication information corresponds to the second authentication information.

3. An image processing apparatus according to claim 2, further comprising an instruction unit which instructs said printer to perform printing based on the image information displayed by said display unit.

4. An image processing method comprising:
using a processor to perform:
an input step of inputting image information including a first image information to be printed on a recording medium and a second image information to be stored in a storage device which is attached to the recording medium;
a first printing step of printing a table of contents of the second image information based on the first image information input in said input step on the recording medium to which the storage device is attached;
a writing step of writing the second image information, first authentication information and second authentication information to the storage device attached to the recording medium, wherein the first authentication information is used for authenticating a first user who is allowed to view a first level of the contents indicated by the table, and the second authentication information is used for authenticating a second user who is allowed to view a second level of the contents indicated by the table and who is not allowed to view the first level of the contents indicated by the table;
a reading step of reading the second image information, the first authentication information and the second authentication which have been stored in the storage device attached to the recording medium on which the table based on the first image information has been printed;
a user authentication information input step of inputting user authentication information;
a second printing step of printing the second image information read in said reading step which the first user can view, if the input user authentication information corresponds to the first authentication information; and
a third printing step of printing the second image information read in said reading step which the second user can view, if the input user authentication information corresponds to the second authentication information.

5. A non-transitory computer-readable storage medium retrievably storing a computer-executable program, said program comprising:
an input step of inputting image information including a first image information to be printed on a recording medium and a second image information to be stored in a storage device which is attached to the recording medium;
a first printing step of printing a table of contents of the second image information based on the first image information input in said input step on the recording medium to which the storage device is attached;
a writing step of writing the second image information, first authentication information and second authentication information to the storage device attached to the recording medium, wherein the first authentication information is used for authenticating a first user who is allowed to view a first level of the contents indicated by the table, and the second authentication information is used for authenticating a second user who is allowed to view a second level of the contents indicated by the table and who is not allowed to view the first level of the contents indicated by the table;
a reading step of reading the second image information, the first authentication information and the second authentication information which have been stored in the storage device attached to the recording medium on which the table based on the first image information has been printed;
a user authentication information input step of inputting user authentication information;
a second printing step of printing the second image information read in said reading step which the first user can view, if the input user authentication information corresponds to the first authentication information; and
a third printing step of printing the second image information read in said reading step which the second user can view, if the input user authentication information corresponds to the second authentication information.

6. An image processing apparatus comprising:
an input unit which inputs first image information to be printed on a recording medium and second image information to be stored in a storage device which is attached to the recording medium;
a printer which prints a table of contents on the recording medium to which the storage device is attached, wherein the table is based on the first image information;
a writing unit which writes the second image information and authentication information to the storage device, wherein the authentication information is used for authenticating a first user who is allowed to view a first level of the contents in the table;
a reading unit which reads each of the second image information and the first authentication information which have been stored in the storage device attached to the recording medium on which the table based on the first image information has been printed; and
a user authentication information input unit which inputs user authentication information,
wherein said printer prints the second image information read by said reading unit which the first user can view, if the user authentication information is input and the input user authentication information corresponds to the authentication information read by the reading unit, and further prints the second image information read by said reading unit which a second user can view, if the user authentication information is not input, and
wherein the second user is allowed to view a second level of the contents indicated by the table without inputting user authentication information, and is not allowed to view the first level of the contents indicated by the table.

* * * * *